US012718404B2

(12) United States Patent
Longanbach

(10) Patent No.: US 12,718,404 B2
(45) Date of Patent: Aug. 25, 2026

(54) IDENTIFICATION OF A TRACK BASED ON TRACK BOLT ORIENTATION

(71) Applicant: Caterpillar Inc., Peoria, IL (US)

(72) Inventor: David M Longanbach, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 189 days.

(21) Appl. No.: 18/383,540

(22) Filed: Oct. 25, 2023

(65) Prior Publication Data

US 2025/0139822 A1 May 1, 2025

(51) Int. Cl.
*G06T 7/73* (2017.01)

(52) U.S. Cl.
CPC ..................................... *G06T 7/74* (2017.01)

(58) Field of Classification Search
None
See application file for complete search history.

(56) References Cited

U.S. PATENT DOCUMENTS 10,190,618 B2 1/2019 Mckinley
10,493,574 B2 12/2019 Johannsen
11,835,955 B2 * 12/2023 Richard .................. E02F 9/267
2008/0178713 A1 7/2008 Long
2015/0337522 A1 11/2015 Diekevers et al.
2019/0392569 A1 * 12/2019 Finch ...................... G06T 19/20
2021/0074089 A1 * 3/2021 Richard ............... G07C 5/0816
2021/0339758 A1 * 11/2021 Laperle ................... E02F 9/267

FOREIGN PATENT DOCUMENTS

AU 2019290409 1/2021
CN 114037029 A 2/2022
CN 115717363 A 2/2023
CN 111400562 B 5/2023

OTHER PUBLICATIONS

Kong, X., & Li, J. (2018). Image registration-based bolt loosening detection of steel joints. Sensors, 18(4), 1000. (Year: 2018).*
International Search Report and Written Opinion for PCT Application No. PCT/US24/47132 mailed Dec. 2024 (Year: 2024).*
Ramana, L., Choi, W., & Cha, Y. J. (2019). Fully automated vision-based loosened bolt detection using the Viola-Jones algorithm. Structural Health Monitoring, 18(2), 422-434. (Year: 2019).*

* cited by examiner

*Primary Examiner* — Ian L Lemieux

(57) ABSTRACT

Method, system, and non-transitory computer-readable storage medium for identifying a track based on orientation information of one or more bolt heads on ground-engaging sides of one or more undercarriage joints of the track are provided. The method includes receiving the orientation information of the one or more bolt heads on ground-engaging sides of the one or more undercarriage joints of the track, generating one or more undercarriage joint identifications corresponding to the one or more undercarriage joints based on the orientation information of the one or more bolt heads, matching the track with a specific track in a database based on the one or more undercarriage joint identifications, and identifying the track as the specific track having a specific track identification in the database.

20 Claims, 6 Drawing Sheets

600
MEMORY
604
PROCESSORS
602
COMMUNICATION
MODULE
606
INTERFACE
608
612
610
100

IDENTIFICATION OF A TRACK BASED ON TRACK BOLT ORIENTATION

TECHNICAL FIELD

The present disclosure relates to identification of a track, and more specifically, to identifying a track based on one or more sets of track bolt patterns.

BACKGROUND

Machines may be used to perform a variety of tasks at a worksite. For example, machines may be used to excavate, move, shape, contour, and/or remove material present at the worksite, such as gravel, concrete, asphalt, soil, and/or other materials. Some of these machines utilize tracks, rather than wheels, to provide ground-engaging propulsion. Such tracks may be preferred in environments where creating sufficient traction or floatation is problematic, such as those frequently found in the worksites identified above. Specifically, rather than rolling across a work surface on wheels, track-type machines utilize one or more tracks that include an endless loop of coupled track links, pins, and bushings defining outer surfaces, which support ground-engaging track shoes, and inner surfaces that travel about one or more rotatable track-engaging elements, such as, drive sprockets, idlers, and rollers, for example.

During operation of the machine, components of the track, such as track links, bushings, shoes, idlers, rollers, and sprockets wear or are damaged, and the machine may be taken off line for maintenance. A worn or damaged track may be repaired by replacing worn or damaged components of the track. However, the repaired track may also be installed on a different machine. The worn or damaged track may also be permanently taken out service, and the machine may receive a different, or new, track. The various dispositions of track assemblies present a challenge to maintain accurate records of what is installed on a machine and the amount of wear present. Some unique physical identification, such as an etched, stamped, and/or tagged serial number, may be attached to a track to provide a traceable identification. However, due to extreme conditions tracks are exposed to at the worksite, these physical identifications often wear off, for example, the serial number is rubbed off or the tag is broken off, and the ability to track the tracks is lost.

SUMMARY

According to a first aspect, a method for identifying a track based on orientation information of one or more bolt heads on ground-engaging sides of one or more undercarriage joints of the track is provided. The method for identifying the track includes receiving the orientation information of the one or more bolt heads on ground-engaging sides of the one or more undercarriage joints of the track, generating one or more undercarriage joint identifications corresponding to the one or more undercarriage joints based on the orientation information of the one or more bolt heads, matching the track with a specific track in a database based on the one or more undercarriage joint identifications, and identifying the track as the specific track having a specific track identification in the database. The orientation information may be received as angles associated with the one or more bolt heads relative to a preselected reference or as one or more images of the ground-engaging sides of the one or more undercarriage joints. The method additionally maintains the database in response to servicing the track by generating an updated undercarriage joint identification of an undercarriage joint associated with the service based on orientations of one or more bolt heads of the undercarriage joint associated with the service, and updating the specific track identification in the database by replacing an undercarriage joint identification of the undercarriage joint associated with the service with the updated undercarriage joint identification.

According to another aspect, a system for identifying a track based on orientation information of one or more bolt heads on ground-engaging sides of one or more undercarriage joints of the track is provided. The system includes one or more processors and memory couple to the one or more processors where the memory stores thereon computer executable instructions that, when executed by one or more processors, cause the one or more processors to perform operations. The operations include receiving orientation information of one or more bolt heads on ground-engaging sides of one or more undercarriage joints of a track, generating one or more undercarriage joint identifications corresponding to the one or more undercarriage joints based on the orientations of the one or more bolt heads, matching the one or more undercarriage joint identifications with undercarriage joint identifications associated with a specific track in a database, identifying the track as the specific track having a specific track identification in the database, and in response to the track being serviced including a first undercarriage joint of the track being replaced with a second undercarriage joint: generating an undercarriage joint identification of the second undercarriage joint based on orientations of one or more bolt heads of the second undercarriage joint, and updating the specific track identification in the database by replacing an undercarriage joint identification of the first undercarriage joint with the undercarriage joint identification of the second undercarriage joint.

According to yet another aspect, a non-transitory computer-readable storage medium that stores thereon computer executable instructions that, when executed by one or more processors, cause the one or more processors to perform operations for identifying a track based on orientation information of one or more bolt heads on ground-engaging sides of one or more undercarriage joints of the track is provided. The operations include receiving orientation information of one or more bolt heads on ground-engaging sides of one or more undercarriage joints of a track, generating one or more undercarriage joint identifications corresponding to the one or more undercarriage joints based on the orientations of the one or more bolt heads, matching the one or more undercarriage joint identifications with undercarriage joint identifications associated with a specific track in a database, identifying the track as the specific track having a specific track identification in the database, and in response to a first undercarriage joint of the track being replaced with a second undercarriage joint: generating an undercarriage joint identification of the second undercarriage joint based on orientations of one or more bolt heads of the second undercarriage joint, and updating the specific track identification in the database by replacing an undercarriage joint identification of the first undercarriage joint with the undercarriage joint identification of the second undercarriage joint.

BRIEF DESCRIPTION OF DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
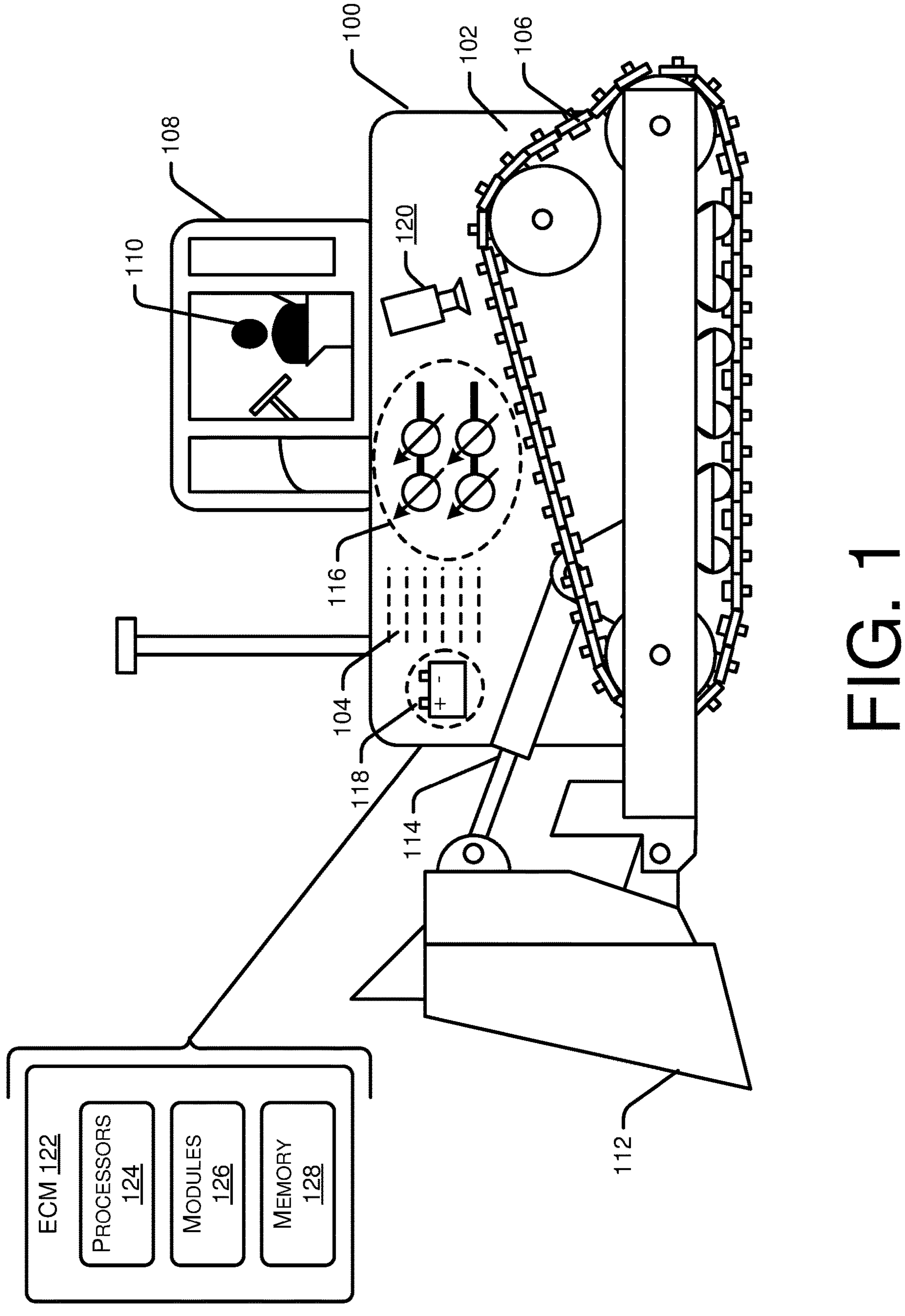
FIG. 1 is a schematic side view of an example machine with tracks for a propulsion system.

FIG. 1 is a schematic side view of an example machine 100 with tracks for a propulsion system. The example machine 100 shown in FIG. 1 is a bulldozer. However, the machine 100 may be any type of work machine configured to travel across and perform operations on terrain, such as an agricultural vehicle, and work vehicles, such as a track loader, a track excavator, a paver, a drill rig, and/or any other machine having tracks known to a person skilled in the art.

The machine 100 includes a chassis or frame 102 to which a prime mover 104 is attached. The prime mover 104 may include an internal combustion engine or "engine", a fuel cell, one or more batteries, or other prime mover types. The prime mover 104 is configured to supply power for operation of the machine 100, including, for example, operating work implements, electronics, and steering, and/or for supplying torque to drive members to propel the machine 100 across the terrain. For example, the machine 100 shown in FIG. 1 includes a propulsion system, such as a pair of tracks 106 (only one set of tracks shown), that are configured to propel the machine 100 across pavement, gravel, dirt, or other work surfaces. Although the machine 100 includes the tracks 106, it is contemplated that the machine 100 may include one or more wheels in addition to the tracks 106. The machine 100 also includes a cab 108 operationally connected to the frame 102 for protecting and/or providing comfort for an operator 110 of the machine 100, and/or for protecting control-related devices of the machine 100. In some examples, the machine 100 may be semi-autonomous or fully autonomous, and able to operate without an onboard or remote operator, and may not include the cab 108. In examples where the machine 100 is semi-autonomous or fully-autonomous, the machine 100 is prevented from, or avoids, accidentally colliding with or maneuvering undesirably close to other machines, personnel, and/or objects.

In the example shown in FIG. 1, the machine 100 also includes a work implement 112 for performing operations associated with the machine 100, such as digging, carrying, raising, and/or depositing material. Although the work implement 112 in FIG. 1 is illustrated as a shovel, other forms of work implements are contemplated. For example, the work implement 112 may include augers, brushcutters, brooms, grapples, hammers, pulverizers, rippers, rotors, shovels, and so forth. The machine 100 includes a work implement actuator 114 coupled at one end to the frame 102 and/or to the proximal end of the work implement 112. The work implement actuator 114 may be hydraulic cylinders powered by one or more hydraulic pumps 116. The work implement actuator 114 may also be electric motors or pneumatic cylinders. The work implement actuator 114 is configured to extend and retract, thereby pivoting the work implement 112 between an upright orientation and an at least partially inverted orientation, for example. In the upright orientation, the work implement 112 may hold material and in the at least partially inverted orientation, the work implement 112 may deposit or dump the material.

The machine 100 may include a battery 118 to power various electrical equipment in the machine 100 including an imaging system, such as a camera 120, and an electronic control module (ECM) 122. The camera 120 may capture images of the tracks 106 and communicate the images to the ECM 122 for monitoring condition and wear of the track 106. The ECM 122 houses one or more processors 124, which may execute any modules, components, or systems associated with the machine 100, some of which may be housed in the ECM 122 as shown as modules 126. In some examples, the processors 124 may include a central processing unit (CPU), a graphics processing unit (GPU), both CPU and GPU, or other processing units or components known in the art. Additionally, each of the processors 124 may possess its own local memory, which also may store program modules, program data, and/or one or more operating systems.

Computer-readable media, such as memory 128, associated with the machine 100 may include volatile memory (e.g., RAM), non-volatile memory (e.g., ROM, flash memory, miniature hard drive, memory card, or the like), or some combination thereof. The computer-readable media may be non-transitory computer-readable media. The computer-readable media may include or be associated with the one or more of the above-noted modules, which perform various operations associated with the machine 100. In some examples, one or more of the modules may include or be associated with computer-executable instructions that are stored by the computer-readable media and that are executable by one or more processors to perform such operations.

Figure 2:
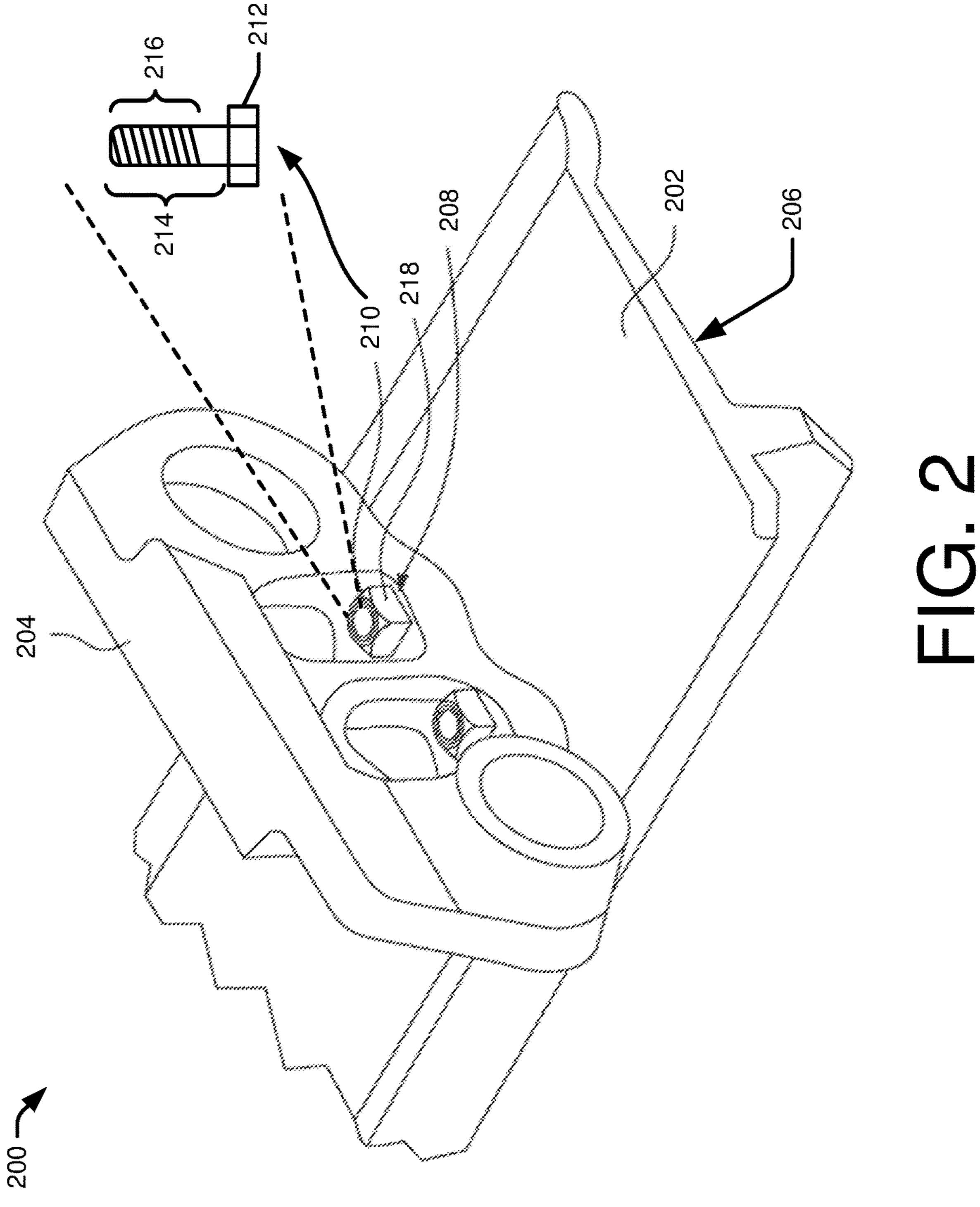
FIG. 2 is a schematic perspective view of an undercarriage joint of the track.

FIG. 2 is a schematic perspective view of an undercarriage joint 200 of the track 106. The undercarriage joint 200 comprises a track shoe 202 and one or more track links 204. The track 106 includes a plurality of undercarriage joints 200, and therefore, also includes a number of track shoes 202 (one of which is shown in FIG. 2). A ground-engaging side 206 of the track shoes 202 contacts and engages with the ground surface as the machine 100 moves on the ground surface. The track 106 also includes a number of track links 204 (one of which is shown in FIG. 2). Further, the track link 204 is coupled to an associated track shoe 202 by a bolted joint 208. For example, the track link 204 is coupled with the respective track shoe 202 by a pair of fasteners 210. Each of the track link 204 and the track shoe 202 include apertures (not shown) that are aligned to receive the fasteners 210. Each fastener 210 includes a head portion, or bolt head, 212, as shown in an expanded view of the fastener 210. The fastener 210 includes a body portion 214 that includes a number of threads 216 extending from the bolt head 212, such that the fastener 210 couples with, and secures, the track shoe 202 and the track link 204, with a nut 218 for tightening the bolted joint 208. Alternatively, the threads 216 of the fastener 210 may couple with, and secure, the track shoe 202 and the track link 204, by directly fastening to a threaded hole (not shown) of the track link 204 for tightening the bolted joint 208.

Figure 3:
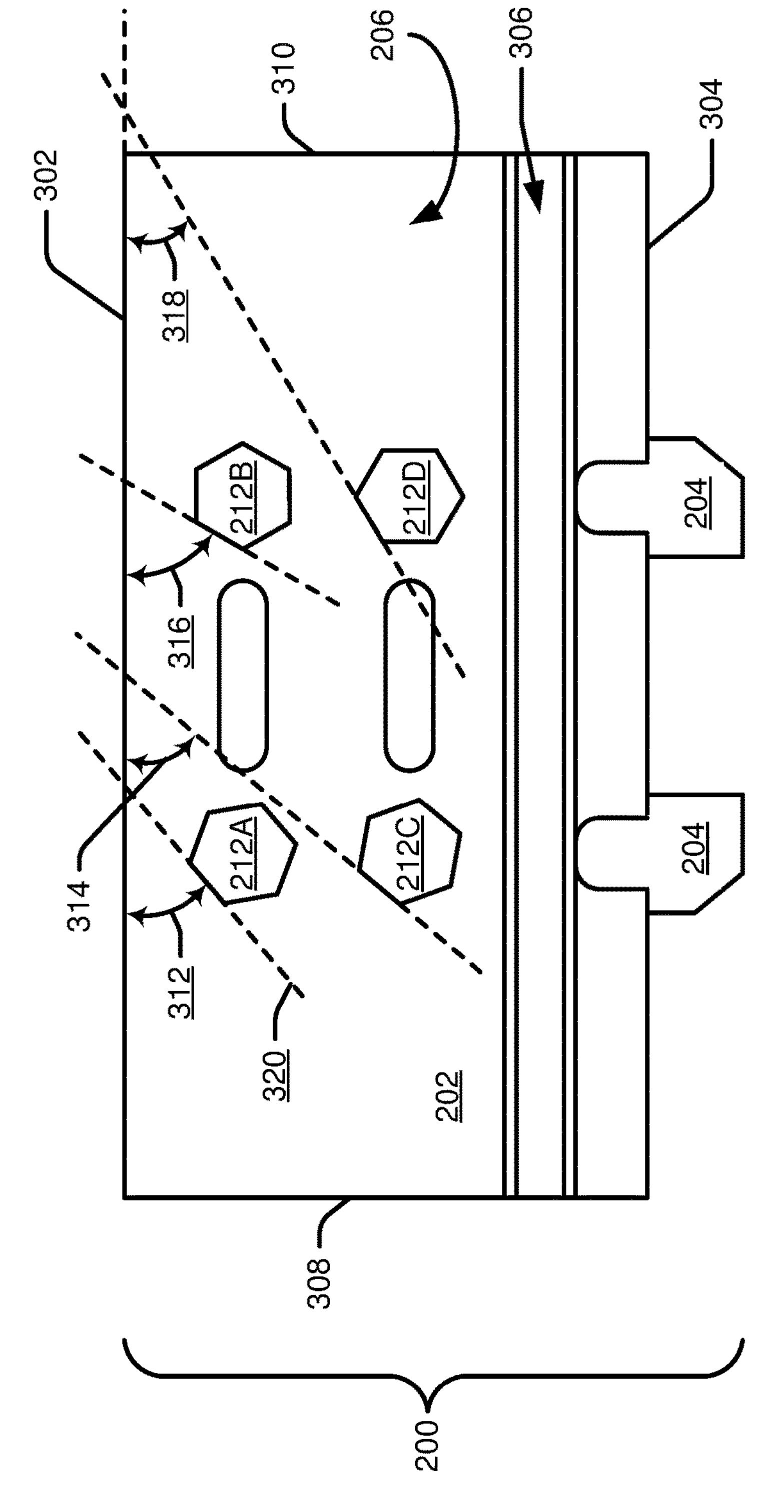
FIG. 3 is a schematic view of an undercarriage joint from the ground-engaging side.

FIG. 3 is a schematic view 300 of an undercarriage joint, such as the undercarriage joint 200, from the ground-engaging side 206. In this example, four fasteners, whose four bolt heads (first bolt head 212A, second bolt head 212B, third bolt head 212C, and fourth bolt head 212D) are visible, secure the track links 204, which are partially visible, to the track shoe 202. When tightened with specified torque for securing the track links 204 to the track shoe 202, the four bolt heads, 212A, 212B, 212C, and 212D, may be oriented in a random pattern, each having its own orientation. This random pattern of the four bolt heads, 212A, 212B, 212C, and 212D, may be utilized to uniquely identify the undercarriage joint 200 associated with four bolt heads, 212A, 212B, 212C, and 212D. While four hexagonal fasteners 212*s* are illustrated in this example, other numbers of fasteners 212*s* and other shapes of fasteners 212*s*, such as triangle, square, pentagonal, hexagonal, octagonal, star, and the like, may be utilized.

To determine the orientations of the four bolt heads, 212A, 212B, 212C, and 212D, a reference line may be selected, or preselected for the purpose of determining the orientations of the four bolt heads, 212A, 212B, 212C, and 212D. For example, a top edge 302 of the track shoe 202, disposed opposite to a bottom edge 304 and a shoe ridge 306, may be used as the reference line. Alternatively, any straight line associated with the track shoe 202 may be selected or preselected, such as the bottom edge 304 and one of side edges 308 and 310. Because the four bolt heads, 212A, 212B, 212C, and 212D are the same, or substantially the same, in size and in shape, which is hexagonal, the orientation of a bolt head repeats every 60 degrees of rotation. Therefore, an orientation of a bolt head 212 may be characterized, or determined, with an angle greater than zero degree but less than or equal to 60 degrees.

To determine the orientation of each bolt head 212, an angle measured between the reference line, the top edge 302 in this example, and a side of a the bolt head 212 may be utilized. The side of the bolt head 212 may be selected from one of six sides of the bolt head 212 that is closer to the reference line (the top edge 302) that makes an angle greater than or equal to zero degree but less than 60 degrees with the reference line. In this example, relative to the reference line, the first bolt head 212A has a first orientation 312 (approximately 40°), the second bolt head 212B has a second orientation 314 (approximately 50°), the third bolt head 212C has a third orientation 316 (approximately 60°), and the fourth bolt head 212D has a fourth orientation 318 (approximately 30°). Based on this set of the four orientations, or angles, an undercarriage joint identification for the undercarriage joint may be generated.

As an example, with a resolution of 10 degrees, each bolt head 212 would have 6 possible orientations, which would provide, with four bolt heads 212 for each undercarriage joint 200, 1,296 possible unique bolt head orientation combinations that may be used as an undercarriage joint identification to identify each undercarriage joint 200. For a group of typical tracks, each having 40 undercarriage joints, each track would have a track identification that is one in $1{,}296^{40}$ possible track identifications.

Instead of using one of edged of the track shoe 202 as the reference line, one side of a bolt head of one of the four bolt heads, 212A, 212B, 212C, and 212D, may be selected as the reference line. Once the reference line is selected, for each of the remaining three bolt heads, a side of the bolt head that makes an angle greater than −30 degree but less than or equal to 30 degrees with the reference line may be used to determine the orientation of the bolt head. In this example, the same sides of the four bolt heads 212A, 212B, 212C, and 212D as the sides used in the previous example are used to determine the orientations of the four bolt heads 212A, 212B, 212C, and 212D. With the side of first bolt head 212A selected as the reference line 320, the first orientation would be 0°, the second orientation would be approximately 10°, the third orientation would be approximately 20°, and the fourth orientation would be approximately −10°. With a resolution of 10 degrees, each bolt head 212 would have 6 possible orientations. However, because one of the bolt heads is used as the reference, only three bolt heads would have variable orientations, providing 216 possible unique bolt head orientation combinations that may be used as an undercarriage joint identification to identify each undercarriage joint 200. For a group of typical tracks, each having 40 undercarriage joints, each track would have a track identification that is one in $216^{40}$ possible track identifications. The examples above for determining the bolt head angles may be performed by an image processing algorithm evaluating an image or a photograph of the undercarriage joints 200. The bolt head angles may also be manually measured and submitted.

Figure 4:
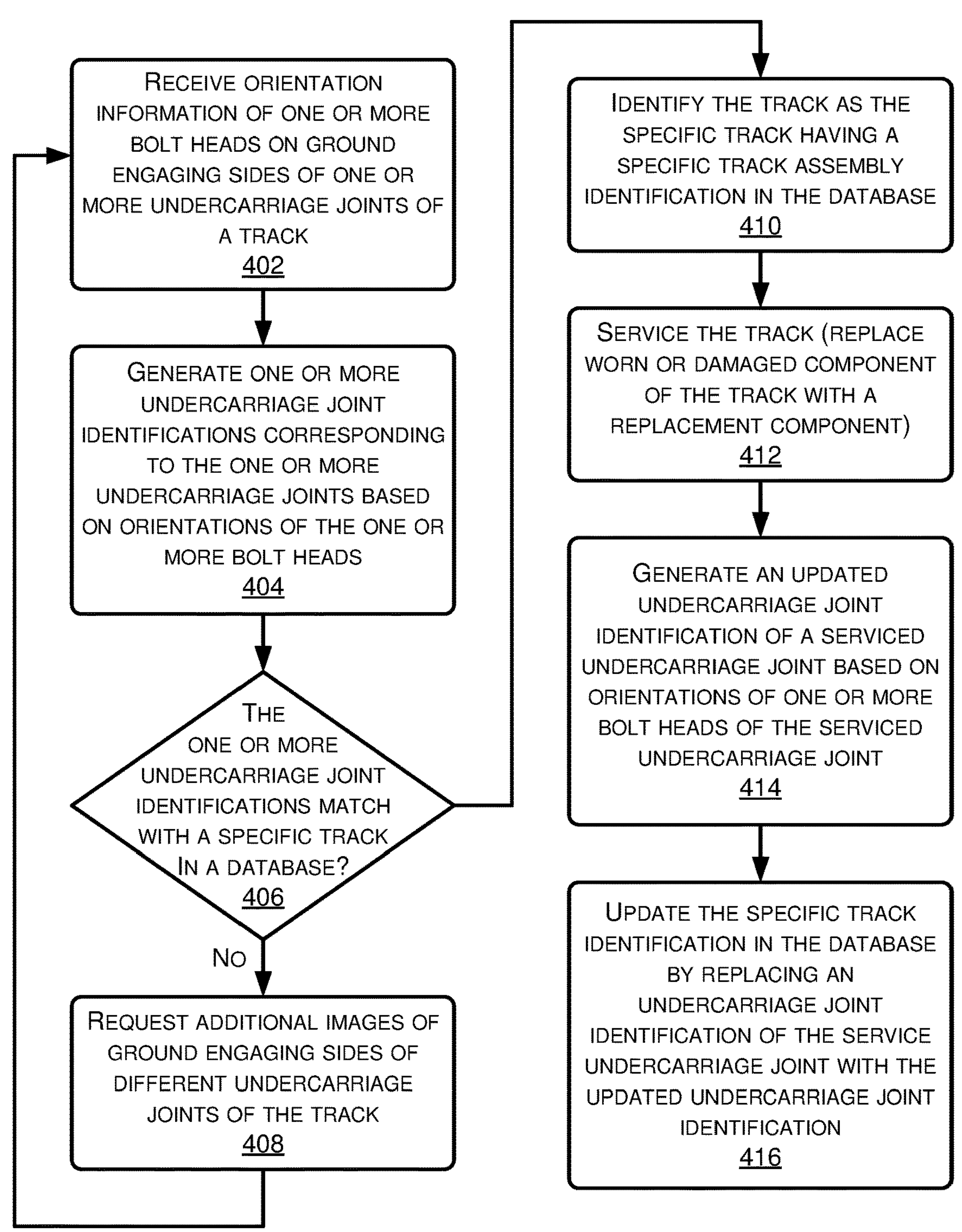
FIG. 4 is a flowchart describing a process of identifying a track based on orientations of one or more bolt heads of one or more undercarriage joints.

FIG. 4 is a flowchart describing a process 400 of identifying a track based on bolt head patterns of one or more undercarriage joints. At block 402, orientation information of one or more bolt heads on ground-engaging sides of one or more undercarriage joints of a track is received. For example, one or more images of ground-engagement sides of the one or more undercarriage joints may be received, and the bolt head angles may be determined according to the process described above with reference to FIG. 3, which may be performed by an image processing algorithm evaluating the one or more images. The one or more images may be received from a machine, such as the machine 100, capturing the one or more images of the track installed on the machine 100 by the camera 120, as described above with reference to FIG. 1. The bolt head angles may also be manually measured and received as the orientation information. At block 404, one or more undercarriage joint identifications corresponding to the one or more undercarriage joints are generated based on the orientations, i.e., angles, of the one or more bolt heads.

At block 406, whether the track matches with a specific track in a database based on the one or more undercarriage joint identifications is determined. That is, the one or more undercarriage joint identifications generated at block 404 are searched against undercarriage joint identifications stored in the database, and one or more stored undercarriage joint identifications within a preselected tolerance of the generated undercarriage joint identifications, or closest in identification out of those searched in the database, are selected as the one or more matched undercarriage joint identifications. Then, whether the one or more matched undercarriage joint identifications are associated with a specific track in the database is determined. The sequence, or order, of the one or more undercarriage joints identifications may also be considered, and compared against a sequence of undercarriage joints identifications in the database. The database stores the undercarriage joint identifications and the track identifications associated with the undercarriage joint identifications. If the one or more undercarriage joint identifications generated are matched with undercarriage joint identifications associated with more than one specific tracks ("No" branch), then additional images of ground-engaging sides of different undercarriage joints of the track are requested at block 408, and the process loops back to block 402. If the one or more undercarriage joint identifications generated are matched with undercarriage joint identifications associated with one specific track ("Yes" branch), then at block 410, the target track is identified as the specific track having a specific track identification in the database.

The process 400 may additionally include servicing the track, such as replacing a first component of the track, which may be a worn or damaged component, such as an undercarriage joint, a track shoe, or a track link, with a second component, at block 412. At block 414, an updated undercarriage joint identification of the undercarriage joint associated with the service, the first component replaced with a second component for example, is generated as described above with reference to FIG. 3 based on orientations of one or more bolt heads of the undercarriage joint associated with the service. The specific track identification in the database is updated by replacing the undercarriage joint identification of the serviced undercarriage joint with the updated undercarriage joint identification at block 416. The track identification may also be associated with additional information, such as current wear condition of the track, supply chain information including component supplier information, a factory where the track was assembled and/or repaired, a current location of the track, such as a dealer or customer information, and the like. The additional information may provide traceability to tracks for quality and maintenance purposes.

Figure 5:
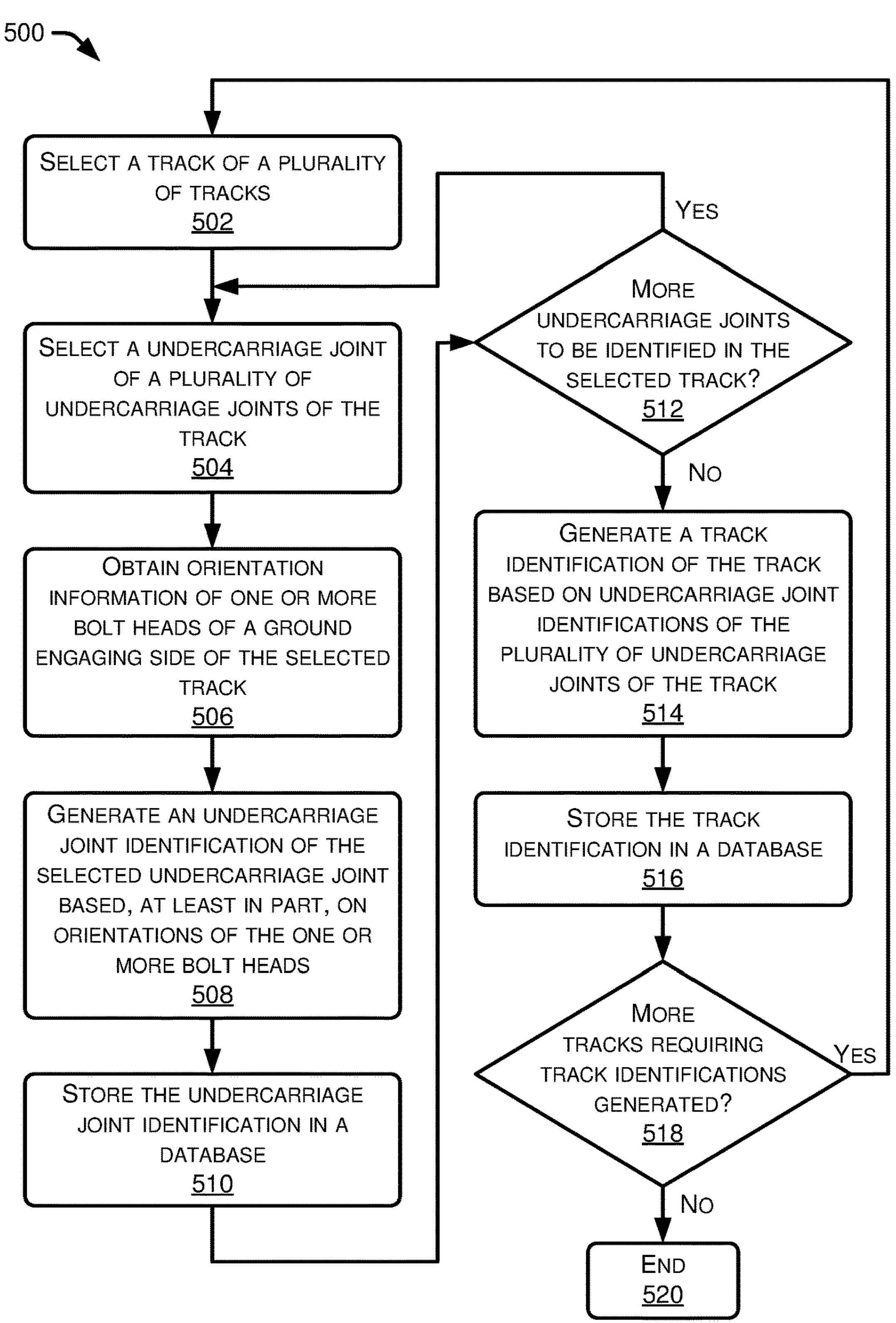
FIG. 5 is a flowchart describing a process of generating a track identification.

FIG. 5 is a flowchart describing a process 500 for generating, and storing in the database, track identifications for a plurality of tracks. As described above with reference to FIGS. 2 and 3, a track, such as the track 106, includes a plurality of undercarriage joints 200, each of which includes a track shoe 202 and one or more track links 204. The track 106 may be one of a plurality of tracks manufactured, stock in a warehouse, or installed on a machine, such as the machine 100. The process 500, for example, may be performed at a manufacturing facility as the tracks are being assembled, at a warehouse where tracks are inventoried and stored, by one or more machines having the tracks installed, or during service or replacement at a dealer or customer.

The track identification generation process begins at block 502, where a track of a plurality of tracks is selected. An undercarriage joint of a plurality of undercarriage joints of the track is selected at block 504. At block 506, orientation information of one or more bolt heads of a ground-engaging side of the undercarriage joint is obtained. The orientation information may include an image of one or more bolt heads, such as the four bolt heads 212A, 212B, 212C, and 212D as described above with reference to FIG. 3. The orientation information may also include measured angles of the one or more bolt heads. The image may be captured by an imaging device, such as a camera, in a manufacturing facility as the tracks are assembled, a camera at a warehouse as the tracks are inventoried, or one or more cameras of a machine monitoring the installed tracks. At block 508, based at least in part on orientations of the four bolt heads, an undercarriage joint identification of the selected undercarriage joint is generated, and the undercarriage joint identification is stored in a database at block 510. The undercarriage joint identification may be generated based on the orientations of the bolt heads by utilizing a preselected reference line or relative angles of the four bolt heads 212A, 212B, 212C, and 212D with one bolt head being the reference, i.e., 0° as described above with reference to FIG. 3.

At block 512, whether there are more undercarriage joints to be identified in the track is checked. If there are one or more undercarriage joints to be identified in the track ("Yes" branch), the process loops back to block 504 and a next undercarriage joint of the track is selected. If there are no more undercarriage joints to be identified in the track ("No" branch), then a track identification of the track is generated based on undercarriage joint identifications of the plurality of undercarriage joints of the track at block 514, and the track identification is stored in the database at block 516.

At block 518, whether there are more tracks of the plurality of tracks that require track identifications generated is checked. If there are one or more tracks requiring track identifications generated ("Yes" branch), the process loops back to block 502 and a next track of the plurality of tracks is selected. If there are no more tracks requiring track identifications generated ("No" branch), the process of generating track identifications for a plurality tracks is completed at block 520.

Figure 6:
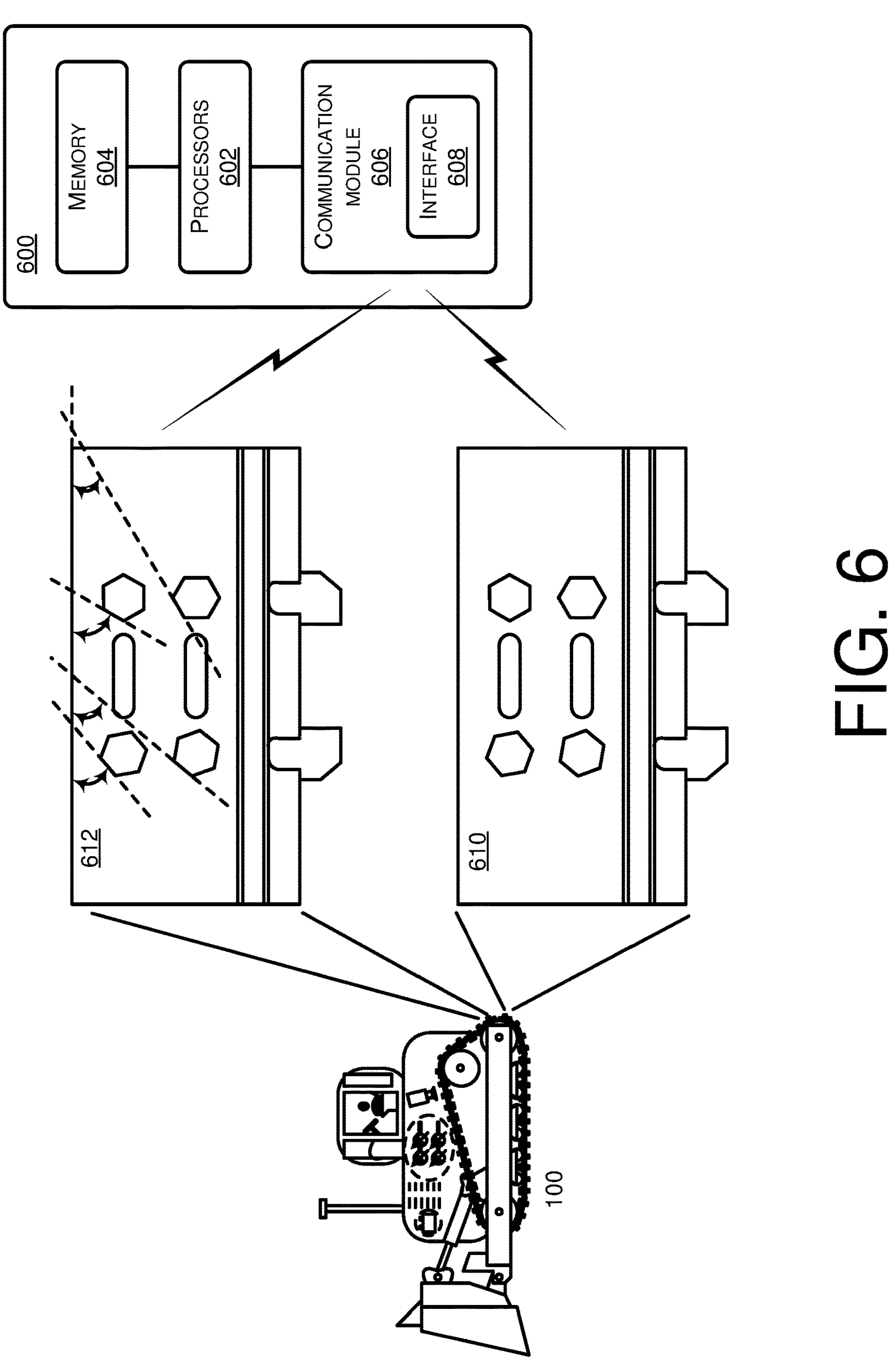
FIG. 6 is a block diagram of a system for identifying a track based on one or more bolt head orientations of one or more undercarriage joints.

FIG. 6 is a block diagram of a system 600 for identifying a track based on one or more bolt head orientations of one or more undercarriage joints. The system 600 may be hosted by a single server or distributedly hosted by a plurality of servers in a cloud environment. The system 600 may comprise one or more processors 602, memory 604 communicatively coupled to the processors 602, and a communication module 606 communicatively coupled to the processors 602. The communication module 606 may include an interface 608, such as a user interface and input/output (I/O) module capable of receiving inputs and providing outputs. The inputs and outputs may be communicated to and from the communication module 606 via a wired or wireless communication network, such as the Internet, a cellular network, local area network (LAN), wireless LAN (WLAN), and the like.

In some examples, the processors 602 may include a central processing unit (CPU), a graphics processing unit (GPU), both CPU and GPU, or other processing units or components known in the art. Additionally, each of the processors 602 may possess its own local memory, which also may store program modules, program data, and/or one or more operating systems. The memory 604 may comprise computer-readable media, which may include volatile memory (e.g., RAM), non-volatile memory (e.g., ROM, flash memory, miniature hard drive, memory card, or the like), or some combination thereof. The computer-readable media may be non-transitory computer-readable media. The computer-readable media may include or be associated with the one or more of the above-noted modules, which perform various operations associated with the system 600. In some examples, one or more of the modules may include or be associated with computer-executable instructions that are stored by the computer-readable media and that are executable by one or more processors to perform such operations.

For the purpose of discussion, unless otherwise specified, FIG. 6 will be described below with respect to the processors 602 of the system 600 performing the steps. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the process. The system 600 may also embody single or multiple microprocessors, field programmable gate arrays (FPGAs), digital signal processors (DSPs), programmable logic controllers (PLCs), etc.

The system 600 may identify a track based on orientation information of one or more bolt heads on ground-engaging sides of one or more undercarriage joints of the track. The system 600 may receive the orientation information, via the communication module 606, as one or more images 610 of the ground-engaging sides of one or more undercarriage joints of the track or as measured bolt head angles 612 of the one or more bolt heads of the one or more undercarriage joints. Based on the orientation information, the processors 602 may identify the track as described above with reference to FIGS. 2-4. The system 600 may also generate track identifications of a plurality of tracks used to identify the track based on the orientation information as described above with reference to FIGS. 2-5. The system may additionally update the database with conditions of tracks as the tracks are serviced, repaired, retired, and the like.

The software and or functionality of the system(s), component(s), algorithms, cloud(s), platform(s), etc., discussed above with reference to FIGS. 3-6 regarding the system 600 may be combined in different ways depending on design requirements, ease of construction and/or integration, cost, etc. Accordingly, while these elements have been separated for purposes of discussion, they may be combined, as appropriate, during implementation.

Some or all operations of the methods described above can be performed by execution of computer-readable instructions stored on a computer-readable storage medium, as defined below: The terms "computer-readable medium," "computer-readable instructions," and "computer executable instructions" as used in the description and claims, include routines, applications, application modules, program modules, programs, components, data structures, algorithms, and the like. Computer-readable and -executable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transitory computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media, when executed by one or more processors, may perform operations described above with reference to FIGS. 3-5. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

INDUSTRIAL APPLICABILITY

The example method of the present disclosure is applicable for identifying a track based on orientation information of one or more bolt heads on ground-engaging sides of one or more undercarriage joints of the track.

For example, the method for identifying the track includes receiving the orientation information of the one or more bolt heads on ground-engaging sides of the one or more undercarriage joints of the track, generating one or more undercarriage joint identifications corresponding to the one or more undercarriage joints based on the orientation information of the one or more bolt heads, matching the track with a specific track in a database based on the one or more undercarriage joint identifications, and identifying the track as the specific track having a specific track identification in the database. The orientation information may be received as angles associated with the one or more bolt heads relative to a preselected reference or as one or more images of the ground-engaging sides of the one or more undercarriage joints. The method additionally maintains and updates the database in response to servicing the track by generating an updated undercarriage joint identification of an undercarriage joint associated with the service based on orientations of one or more bolt heads of the undercarriage joint associated with the service, and updating the specific track identification in the database by replacing an undercarriage joint identification of the undercarriage joint associated with the service with the updated undercarriage joint identification.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the examples above, it will be understood by those skilled in the art that various additional embodiments may be contemplated by the modification of the disclosed devices, systems, and methods without departing from the spirit and scope of what is disclosed. Such embodiments should be understood to fall within the scope of the present disclosure as determined based upon the claims and any equivalents thereof.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein.

What is claimed is:

1. A method comprising:

receiving orientation information of one or more bolt heads on ground-engaging sides of one or more undercarriage joints of a track;

generating one or more undercarriage joint identifications corresponding to the one or more undercarriage joints based on the orientation information of the one or more bolt heads;

matching the track with a specific track in a database based on the one or more undercarriage joint identifications;

identifying the track as the specific track having a specific track identification in the database, the specific track identification including a prior condition of the track;

servicing the track;

generating an updated undercarriage joint identification of an undercarriage joint associated with the servicing based on orientations of one or more bolt heads of the undercarriage joint associated with the servicing;

updating the specific track identification in the database, the updating including:

replacing an undercarriage joint identification of the undercarriage joint associated with the servicing with the updated undercarriage joint identification, and replacing the prior condition of the track with a current condition of the track.

2. The method of claim 1, wherein servicing the track includes:

removing the track from a first machine;

repairing the track; and installing the track on a second machine.

3. The method of claim 2, wherein the condition of the track includes the identity of the first machine, and wherein the current condition of the track includes the identity of the second machine.

4. The method of claim 1, wherein receiving the orientation information of the one or more bolt heads on the ground-engaging sides of the one or more undercarriage joints of the track includes:

receiving angles associated with the one or more bolt heads relative to a preselected reference.

5. The method of claim 1, wherein receiving the orientation information of the one or more bolt heads on the ground-engaging sides of the one or more undercarriage joints of the track includes:

receiving the one or more images are of the ground-engaging sides of the one or more undercarriage joints.

6. The method of claim 5, receiving the one or more images of the ground-engaging sides of the one or more undercarriage joints includes:

receiving the one or more images captured by an imaging system of a machine with the track.

7. The method of claim 5, wherein, for each image of the one or more images, generating the one or more undercarriage joint identifications corresponding to the one or more undercarriage joints based on the orientation information of the one or more bolt heads includes:

identifying a preselected reference line in the image;

determining a corresponding orientation of each of the one or more bolt heads relative to the preselected reference line; and generating an undercarriage joint identification of a corresponding undercarriage joint based on the corresponding orientation of each of the one or more bolt heads.

8. The method of claim 7, wherein:

the one or more bolt heads are hexagonal in shape and similar in size, and the corresponding orientation of each of the one or more bolt heads relative to the preselected reference line is an angle formed by the preselected reference line and a side of a corresponding bolt head measuring greater than 0 and less than or equal to 60 degrees.

9. The method of claim 5, wherein, for each image of the one or more images, generating the one or more undercarriage joint identifications corresponding to the one or more undercarriage joints based on the orientation information of the one or more bolt heads includes:

selecting a first bolt head from the one or more bolt heads;

determining a first orientation of the first bolt head;

determining orientations of remaining bolt heads of the one or more bolt heads relative to the first orientation; and generating an undercarriage joint identification of a corresponding undercarriage joint based on the orientations of the remaining bolt heads.

10. The method of claim 9, wherein:

the one or more bolt heads are similar in shape and size, and determining the first orientation of the first bolt head includes selecting a side of the first bolt head as a reference line for the remaining bolt heads.

11. The method of claim 1, wherein, prior to receiving the orientation information of the one or more bolt heads on the ground-engaging sides of the one or more undercarriage joints of the track, the database is generated by:

for a track comprising a plurality of undercarriage joints:

obtaining corresponding orientation information of one or more bolt heads on a ground-engaging side of each undercarriage joint of the plurality of undercarriage joints, generating a corresponding undercarriage joint identification based at least in part on the corresponding orientation information, and storing the corresponding undercarriage joint identification in a database;

generating a track identification of the track based on the undercarriage joint identifications of the plurality of undercarriage joints of the track; and storing the track identification in the database.

12. The method of claim 11, wherein the track is a first track of a plurality of tracks, the method further comprising:

repeating the steps of claim 11 for remaining tracks of the plurality of tracks.

13. A system comprising:

one or more processors;

memory coupled to the one or more processors, the memory storing thereon computer executable instructions that, when executed by one or more processors, cause the one or more processors to perform operations comprising:

receiving orientation information of one or more bolt heads on ground-engaging sides of one or more undercarriage joints of a track;

generating one or more undercarriage joint identifications corresponding to the one or more undercarriage joints based on the orientation information of the one or more bolt heads;

matching the one or more undercarriage joint identifications with undercarriage joint identifications associated with a specific track in a database;

identifying the track as the specific track having a specific track identification in the database, the specific track identification including a prior condition of the track; and in response to the track being serviced including a first undercarriage joint of the track being replaced with a second undercarriage joint;

generating an undercarriage joint identification of the second undercarriage joint based on orientations of one or more bolt heads of the second undercarriage joint, and updating the specific track identification in the database, the updating including:

replacing an undercarriage joint identification of the first undercarriage joint with the undercarriage joint identification of the second undercarriage joint, and replacing the prior condition of the track with a current condition of the track.

14. The system of claim 13, further comprising:

a communication module coupled to the one or more processors, wherein receiving the orientation information of the one or more bolt heads on the ground-engaging sides of the one or more undercarriage joints of the track include:

receiving, via the communication module, at least one of:

angles associated with the one or more bolt heads relative to a preselected reference, or one or more images of the ground-engaging sides of the one or more undercarriage joints.

15. The system of claim 14, wherein, for each image of the one or more images, generating the one or more undercarriage joint identifications corresponding to the one or more undercarriage joints based on the orientation information of the one or more bolt heads includes:

identifying a preselected reference line in the image;

determining a corresponding orientation of each of the one or more bolt heads relative to the preselected reference line; and generating an undercarriage joint identification of a corresponding undercarriage joint based on the corresponding orientation of each of the one or more bolt heads.

16. The system of claim 14, wherein, for each image of the one or more images, generating the one or more undercarriage joint identifications corresponding to the one or more undercarriage joints based on the orientation information of the one or more bolt heads includes:

selecting a first bolt head from the one or more bolt heads;

determining a first orientation of the first bolt head;

determining orientations of remaining bolt heads of the one or more bolt heads relative to the first orientation; and generating an undercarriage joint identification of a corresponding undercarriage joint based on the orientations of the remaining bolt heads.

17. A non-transitory computer-readable storage medium storing thereon computer executable instructions that, when executed by one or more processors, cause the one or more processors to perform operations comprising:

receiving orientation information of one or more bolt heads on ground-engaging sides of one or more undercarriage joints of a track;

generating one or more undercarriage joint identifications corresponding to the one or more undercarriage joints based on the orientation information of the one or more bolt heads;

matching the one or more undercarriage joint identifications with undercarriage joint identifications associated with a specific track in a database;

identifying the track as the specific track having a specific track identification in the database, the specific track identification including a prior condition of the track; and in response to a first undercarriage joint of the track being replaced with a second undercarriage joint:

generating an undercarriage joint identification of the second undercarriage joint based on orientations of one or more bolt heads of the second undercarriage joint, and updating the specific track identification in the database, the updating including:

replacing an undercarriage joint identification of the first undercarriage joint with the undercarriage joint identification of the second undercarriage joint, and replacing the prior condition of the track with a current condition of the track.

18. The non-transitory computer-readable storage medium of claim 17, wherein receiving the orientation information of the one or more bolt heads on the ground-engaging sides of the one or more undercarriage joints of the track include:

receiving at least one of:

angles associated with the one or more bolt heads relative to a preselected reference, or one or more images of the ground-engaging sides of the one or more undercarriage joints.

19. The non-transitory computer-readable storage medium of claim 18, wherein, for each image of the one or more images, generating the one or more undercarriage joint identifications corresponding to the one or more undercarriage joints based on the orientation information of the one or more bolt heads includes:

identifying a preselected reference line in the image;

determining a corresponding orientation of each of the one or more bolt heads relative to the preselected reference line; and generating an undercarriage joint identification of a corresponding undercarriage joint based on the corresponding orientation of each of the one or more bolt heads.

20. The non-transitory computer-readable storage medium of claim 18, wherein, for each image of the one or more images, generating the one or more undercarriage joint identifications corresponding to the one or more undercarriage joints based on the orientation information of the one or more bolt heads includes:

selecting a first bolt head from the one or more bolt heads;

determining a first orientation of the first bolt head;

determining orientations of remaining bolt heads of the one or more bolt heads relative to the first orientation; and generating an undercarriage joint identification of a corresponding undercarriage joint based on the orientations of the remaining bolt heads.

* * * * *